Aug. 21, 1962 W. B. SAUNDERS 3,050,273
ROLL CARRIER
Filed June 3, 1960
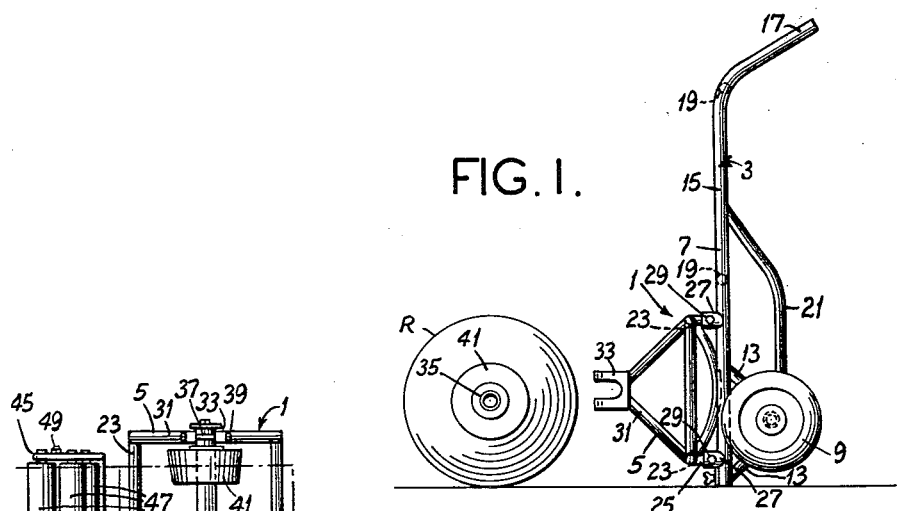
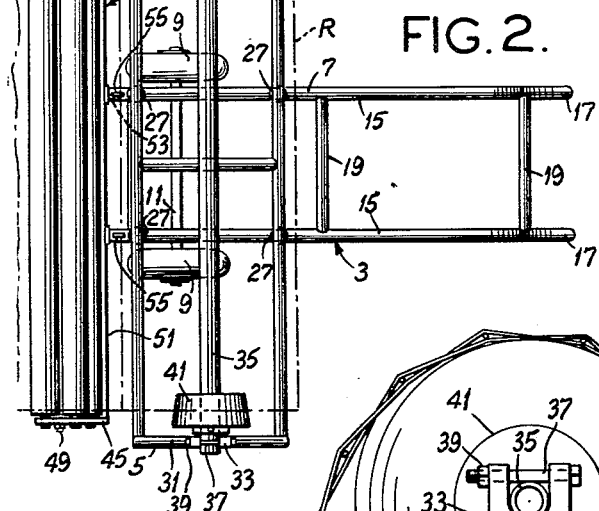
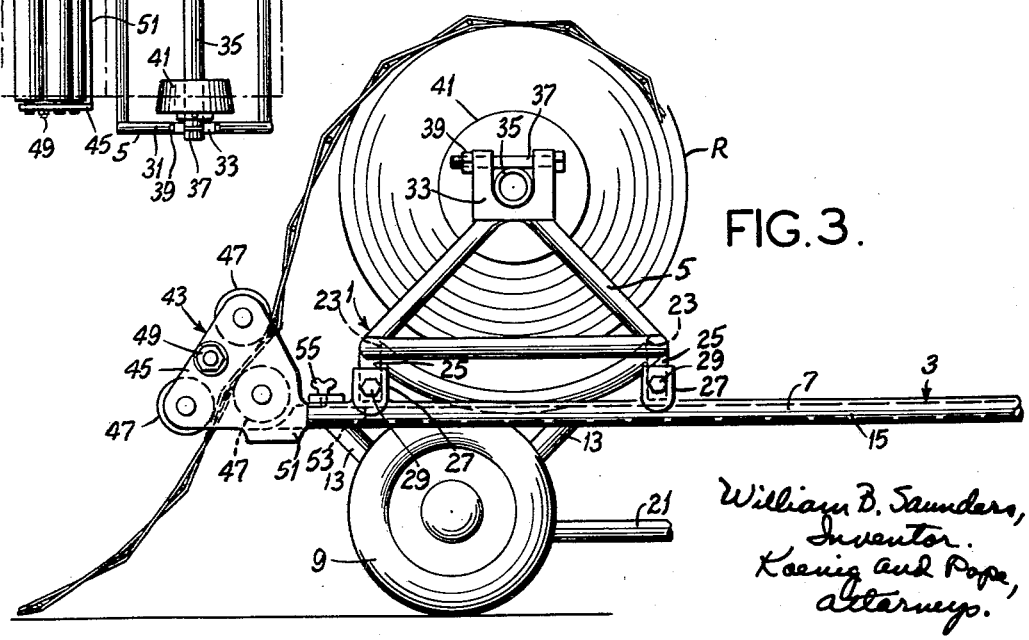

United States Patent Office 3,050,273
Patented Aug. 21, 1962

3,050,273
ROLL CARRIER
William B. Saunders, 2843 Henrietta, St. Louis, Mo.
Filed June 3, 1960, Ser. No. 33,686
3 Claims. (Cl. 242—86.52)

This invention relates to a carrier, and more particularly to a wheeled roll carrier for carrying a roll of reinforcing mesh such as is commonly used in the construction of concrete floors and pavements.

Among the several objects of the invention may be noted the provision of a wheeled roll carrier adapted to conveniently carry a roll of reinforcing mesh for use in the construction of concrete floors and pavements; the provision of a carrier of this type which is portable and may be readily moved about on the job; the provision of such a carrier from which a roll of reinforcing mesh may be continuously unrolled with the desired side of the mesh in a face-up position; the provision of a carrier of the type indicated which is adapted to straighten or flatten the mesh prior to its being laid; and the provision of such a roll carrier which is of simple and economical construction. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view in elevation showing a carrier of the present invention in a position to accept a roll of reinforcing mesh;

FIG. 2 is a top plan view of a carrier of the invention with a roll of reinforcing mesh carried thereby shown in dotted lines and with a straightening roll assembly thereon; and FIG. 3 is a view in elevation of a carrier of the invention including the straightening roll assembly.

Corresponding reference characters indicate corresponding parts throughout the several views of the drawings.

Referring now to the drawings, a carrier of the present invention generally designated 1 is shown to comprise a truck 3 having a pair of roll supports 5 carried thereby. It will be understood that the truck 3 may be a conventional hand truck having the lift toe at the forward end removed therefrom. The truck 3 comprises a frame 7 having a pair of wheels 9 mounted on the bottom thereof and connected by means of an axle 11 on which they are journalled. As shown, wheels 9 are mounted on the frame by means of supporting braces 13.

The frame 7 consists of a pair of tubular side members 15 having curved portions at one end constituting handles 17 and supporting members 19 extending transversely of the truck 3 between side members 15. A pair of supporting braces 21 extend from side members 15 to axle 11 on each side of the frame 7.

At 23 is indicated a pair of tubular members supporting the roll supports 5 on the truck 3. Each tubular member 23 extends transversely of the truck 3 beyond tubular side members 15 of the truck and has a pair of laterally spaced legs 25 extending down therefrom into upwardly extending tubular bosses 27 on tubular side members 15. The legs 25 are removably secured in the bosses 27 by set screws 29. Each roll support comprises a triangular frame 31 extending up from tubular members 23. At the apex of each triangular frame 31 is a journal 33 having an open-ended recess for removably receiving an arbor 35. The ends of arbor 35 are retained in the recesses in journals 33 by means of bolts 37 extending through the upper ends of journals 33 and threaded onto nuts 39. At the ends of the arbor 35 are two conical chucks 41 adapted for entry in the ends of a roll R of reinforcing mesh.

At the forward end of the truck 3 is a straightening roll assembly generally designated 43 for straightening and flattening out reinforcing mesh unrolled from the roll R. The assembly 43 consists of a pair of side plates 45 having journalled therein three straightening rolls 47 and a separating bar 49. At 51 is indicated a bar extending transversely between the side plates 45 and having a pair of tubular prongs 53 extending out therefrom. As shown, tubular prongs 53 are received in the open ends of tubular side members 15 and assembly 43 is then locked in position on the carrier 1 by set screws 55.

In use, the carrier 1 of the invention, with assembly 43 removed, is tilted to stand on its forward end (as shown in FIG. 1) adjacent a roll R of reinforcing mesh with bolts 37 and nuts 39 removed from the upper ends of journals 33 for entry of the arbor 35 therein. Arbor 35 is inserted through the central opening of the roll R and the conical chucks 41 on each end of the arbor 35 are entered in the roll R bearing against the innermost layer of the mesh. The roll R is next rolled into position between roll supports 5 of the carrier 1 with the respective ends of arbor 35 received in journals 33, after which bolts 37 are inserted through the upper ends of journals 33 and threaded onto nuts 39 to retain the arbor 35 in the carrier.

The carrier 1 with the roll R carried thereby is then tilted back to its normal position (shown in FIG. 3). Next, the straightening roll assembly 43 is put into position at the forward end of the truck 3 by inserting tubular prongs 53 thereof into the open ends of tubular side members 15 and locking the assembly in position by means of set screws 55. The carrier 1 is then wheeled to the job location and the end of the mesh in roll R is trained through straightening roll assembly 43 as shown in FIG. 3. By moving the carrier 1 in a direction opposite to that in which the roll is being unrolled, the reinforcing mesh is continuously unrolled from roll R, passed through the straightening roll assembly 43 to straighten and flatten out the mesh and then laid flatwise in the desired position on the job.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A wheeled roll carrier for carrying a roll of reinforcing mesh, said carrier comprising a frame, a pair of wheels mounted on one side of the frame and adjacent one end of the frame, said frame comprising a pair of tubular side members having curved portions constituting handles at the end opposite the said one end of the frame, a pair of roll supports extending from the other side of the frame adjacent the said one end of the frame, said supports having open-ended recesses at their outer ends, an arbor received in said recesses extending transversely of the frame, means for retaining the arbor in the recesses, said means being removable from the open ends of the recesses, a pair of chucks on the arbor for entry in the ends of a roll of reinforcing mesh, and a removable straightening roll assembly mounted at said one end of the frame for straightening reinforcing mesh unrolled from a roll thereof carried by said arbor, said straightening roll assembly comprising a pair of side plates having a plurality of straightening rolls carried thereby and having a pair of tubular prongs extending out therefrom, said prongs being removably received in said tubular side members at said one end of the frame, said frame being adapted to stand on its said one end when said assembly is removed for entry of said arbor into said recesses, when said retaining means are removed, by rolling the roll.

2. A wheeled roll carrier as set forth in claim 1 wherein each of said roll supports is carried by a pair of tubular members extending transversely of said frame and supported by said tubular side members.

3. A wheeled roll carrier as set forth in claim 2 wherein each of said roll supports comprises a triangular frame having said recess at its apex for receiving said arbor.

References Cited in the file of this patent

UNITED STATES PATENTS

| | | |
|---|---|---|
| 315,803 | Logan | Apr. 14, 1885 |
| 2,087,010 | Wardle et al. | July 13, 1937 |
| 2,155,769 | Porter | Apr. 25, 1939 |
| 2,355,441 | Jacob | Aug. 8, 1944 |
| 2,488,425 | Morrone | Nov. 15, 1949 |
| 2,518,990 | Keener | Aug. 15, 1950 |
| 2,664,253 | Therrion | Dec. 29, 1953 |
| 2,847,171 | Keesee | Aug. 12, 1958 |